US011168681B2

(12) United States Patent
Boguski et al.

(10) Patent No.: US 11,168,681 B2
(45) Date of Patent: Nov. 9, 2021

(54) DRIVE SYSTEM FOR HYDRAULIC FRACTURING PUMP

(71) Applicant: ST9 Gas and Oil, LLC, The Woodlands, TX (US)

(72) Inventors: Brian Boguski, Milford, OH (US); Christopher Paul Buckley, Montgomery, TX (US)

(73) Assignee: ST9 Gas and Oil, LLC, The Woodlands, TX (US)

( * ) Notice: Subject to any disclaimer, the term of this patent is extended or adjusted under 35 U.S.C. 154(b) by 0 days.

(21) Appl. No.: 17/154,107

(22) Filed: Jan. 21, 2021

(65) Prior Publication Data

US 2021/0231119 A1 Jul. 29, 2021

Related U.S. Application Data

(60) Provisional application No. 62/965,093, filed on Jan. 23, 2020.

(51) Int. Cl.
| | | |
|---|---|---|
| *F04B 53/00* | (2006.01) | |
| *E21B 43/26* | (2006.01) | |
| *F04B 53/16* | (2006.01) | |
| *F16H 1/22* | (2006.01) | |

(52) U.S. Cl.
CPC ........ *F04B 53/006* (2013.01); *E21B 43/2607* (2020.05); *F04B 53/16* (2013.01); *F16H 1/22* (2013.01)

(58) Field of Classification Search
CPC .... F04B 53/006; F04B 53/16; E21B 43/2607; F16H 1/22; F16H 57/0018
See application file for complete search history.

(56) References Cited

U.S. PATENT DOCUMENTS

| | | | | |
|---|---|---|---|---|
| 1,867,585 | A * | 7/1932 | Moore ..................... | F04B 53/10 417/536 |
| 2,137,552 | A * | 11/1938 | Valentine .............. | F04B 53/006 74/596 |
| 2,519,501 | A * | 8/1950 | Redman .................... | F16C 9/04 74/44 |
| 4,329,856 | A * | 5/1982 | Lucas ....................... | F16D 3/56 464/82 |
| 4,512,694 | A * | 4/1985 | Foran ........................ | B23F 1/00 29/893.1 |
| 8,696,324 | B2 * | 4/2014 | Williams .................. | F04B 9/02 417/269 |

(Continued)

*Primary Examiner* — Nathan C Zollinger

(57) ABSTRACT

A hydraulic fracturing pump includes a pinion assembly extending along a pinion axis and mounted in a crankcase, and having a first pinion shaft and a second pinion shaft coupled together by a keyless coupler. Each pinion shaft includes an input pinion gear mounted on one end of the pinion shaft. A crankshaft disposed along a crankshaft axis is mounted in the crankcase, and is parallel with but spaced apart from the pinion axis. The crankshaft includes a bull gear mounted on each end of the crankshaft with each bull gear interconnected to an input pinion gear by an intermediate gear assembly. Each intermediate gear assembly extends along an intermediate axis parallel with, but spaced apart from, the crankcase and pinion axii. Each intermediate assembly has an intermediate shaft with a first intermediate gear meshed with a pinion gear and a second intermediate gear meshed with the bull gear.

21 Claims, 8 Drawing Sheets

(56) References Cited

U.S. PATENT DOCUMENTS

| | | | | |
|---|---|---|---|---|
| 10,246,955 B2* | 4/2019 | Berthaud | ................ | F04B 19/22 |
| 10,280,910 B2* | 5/2019 | Berthaud | ................ | F04B 35/01 |
| 10,352,321 B2* | 7/2019 | Byrne | .................... | F04B 53/18 |
| 2004/0219040 A1* | 11/2004 | Kugelev | ................ | F04B 17/03 |
| | | | | 417/415 |
| 2007/0041849 A1* | 2/2007 | Allen | ........................ | F04B 9/02 |
| | | | | 417/273 |

* cited by examiner

US 11,168,681 B2

DRIVE SYSTEM FOR HYDRAULIC FRACTURING PUMP

PRIORITY

The present application claims priority to U.S. Provisional Application No. 62/965,093, filed Jan. 23, 2020, the benefit of which is claimed and the disclosure of which is incorporated herein by reference in its entirety.

TECHNICAL FIELD

The present application relates generally to hydraulic fracturing in oil and gas wells, and in particular to a hydraulic fracturing pump power end drive system.

BACKGROUND

It is difficult to economically produce hydrocarbons from low-permeability reservoir rocks. Oil and gas production rates are often boosted by hydraulic fracturing, a technique that increases rock permeability by opening channels through which hydrocarbons can flow to recovery wells. Hydraulic fracturing has been used for decades to stimulate production from conventional oil and gas wells. The practice consists of pumping fluid into a wellbore at high-pressure (sometimes as high as 50,000 PSI). Inside the wellbore, large quantities of proppants are carried in suspension by the fracture fluid into the fractures. When the fluid enters the formation, it fractures, or creates fissures, in the formation. Water, as well as other fluids, and some solid proppants, are then pumped into the fissures to stimulate the release of oil and gas from the formation. When the pressure is released, the fractures partially close on the proppants, leaving channels for oil and gas to flow.

Fracturing rock in a formation requires that the fracture fluid be pumped into the wellbore at very high-pressure. This pumping is typically performed by high-pressure, hydraulic fracturing pumps, with a diesel engine used to power operation of the pump to deliver fracture fluids at sufficiently high flow rates and pressures to complete a hydraulic fracturing procedure or "frac job." These pumps are generally comprised of a power end and a fluid end. The fluid end of such a pump is utilized to pressurize a working fluid and may include a fluid suction manifold, a fluid discharge manifold, a fluid cylinder and a plunger. The power end of such a pump may include a crankcase in which a crankshaft is rotated in order to drive a plurality of piston arms. The piston arms in turn reciprocate crossheads. These crossheads are attached to the plunger(s) of the fluid end to drive the plunger(s) within the fluid cylinder. A power source, such as a diesel engine, is utilized to drive the crankshaft via a pinion shaft having a pinion gear integrally formed on each end. Each pinion gear in turn engages a separate bull gear carried on the crankshaft and secured on the crankshaft by a key joint. The key joint of the bull gear may be manipulated to adjust for backlash between the meshed gears. One drawback to the forgoing is the difficulty in adjusting backlash for such systems. Moreover, because of the tight mesh between the gears, the need to correctly adjust for backlash is heightened since it is known that too tight of a gear mesh can lead to premature gear wear and excessive heating of the bull gear, while too loose of a mesh will not achieve optimal mechanical engagement, leading to excess stress on the tips of the teeth which can cause premature wear. This can be especially problematic due to the nature of hydraulic fracturing pumps, which operate for long periods of time and at high rates of speed to achieve the desired fluid pressures needed to crack the formation around a wellbore.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Generally, the power end of a hydraulic fracturing pump is provided and includes crankcase in which is mounted a crankshaft, a pinion assembly and one or more spaced apart intermediate assemblies. The pinion assembly extends along a pinion axis and has a first pinion shaft and a second pinion shaft coupled together by a keyless coupler. Each pinion shaft includes an input pinion gear mounted on one end of the pinion shaft. The crankshaft is disposed along a crankshaft axis that is parallel with but spaced apart from the pinion axis and includes a crankshaft gear mounted on each end of the crankshaft. Each crankshaft gear is interconnected to a pinion gear by an intermediate gear assembly. Each intermediate gear assembly extends along an intermediate axis parallel with, but spaced apart from the crankcase axis and the pinion axis. Each intermediate assembly has an intermediate shaft with a first intermediate gear meshed with a pinion gear and a second intermediate gear meshed with the bull gear. Rotation of the crankshaft drives a plurality of piston arms which in turn cause reciprocation of a plurality of crossheads mounted in the crankshaft housing. Each crosshead has a crosshead axis along which the crosshead reciprocates. Each crosshead axis is generally perpendicular to the crankshaft axis.

Figure 1:
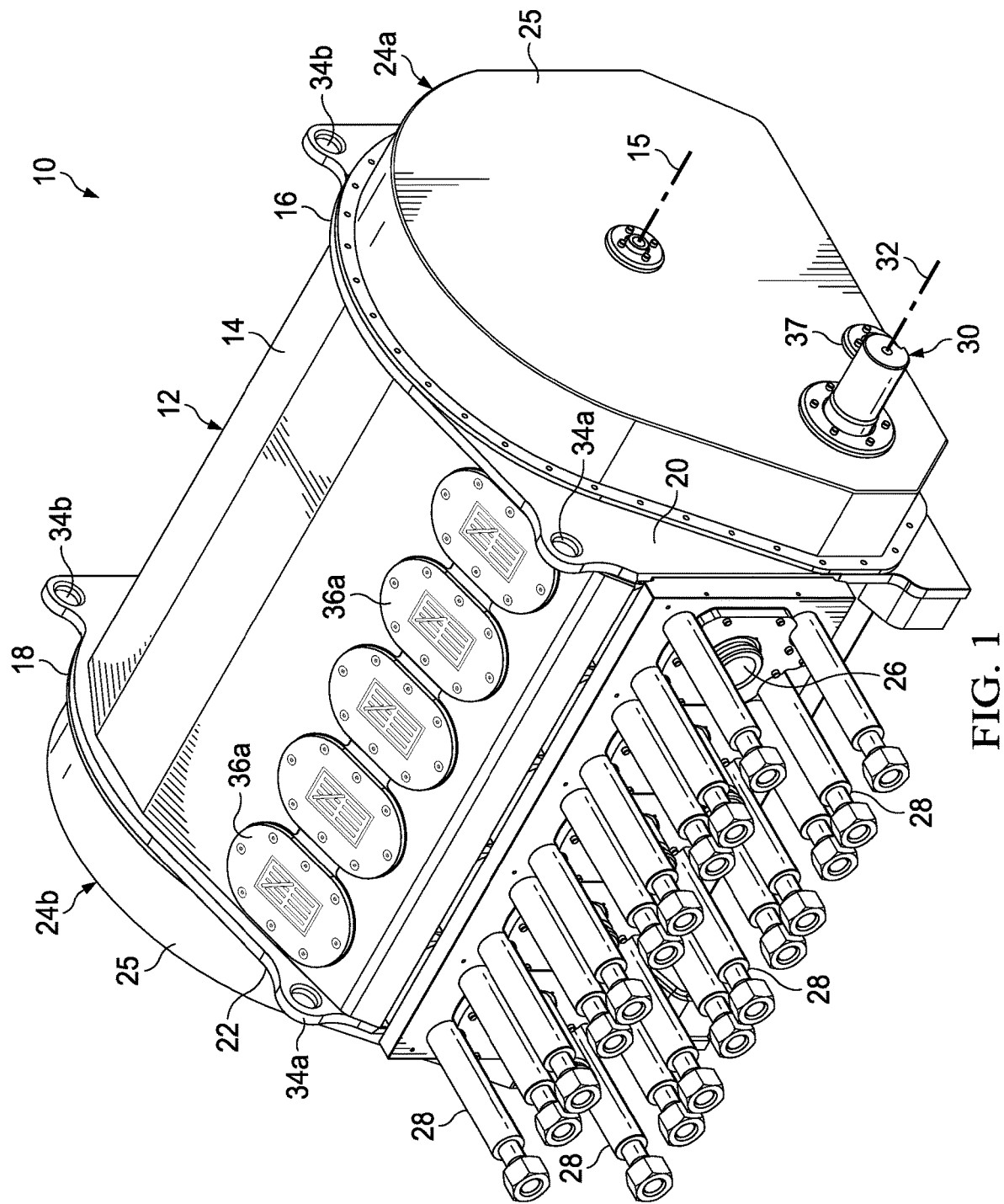
FIG. 1 is a perspective view of the power end of a hydraulic fracturing pump system according to embodiments of the present disclosure.

FIG. 1 is a perspective view of a power end 10 of a hydraulic fracturing pump (not shown). Power end 10 generally includes a crankcase 12 formed of a crankcase housing 14 extending along a crankcase axis 15. The crankcase housing 14 has a first end 16 and a second end 18 with a first side 20 enclosing the crankcase housing 14 at the first end 16 and a second side 22 enclosing the crankcase housing 14 at the second end 18. In one or more embodiments, a gearbox assembly 24 may be attached to at least one of the ends 16, 18 of crankcase housing 14. Each gearbox assembly 24 includes a gearbox housing 25 attached at gearbox ends 16, 18. In the illustrated embodiment, a first gearbox assembly 24a is attached to the first end 16 of crankcase 12 and a second gearbox assembly 24b is attached to the second end 18 of crankcase 12. A plurality of crosshead extension rods 26 are shown extending from crankcase housing 14. In one or more embodiments, a plurality of stay rods 28 may also extend from crankcase housing 14 generally adjacent to and parallel with crosshead extension rods 26. Persons of skill in the art will appreciate that a fluid end (not shown) of a hydraulic fracturing pump may generally be attached to say rods 28 as is well known in the industry.

Power end 10 includes a pinion assembly 30 having a pinion axis 32 and generally extending at least partially between the first side 20 and the second side 22 of crankcase housing 14. Pinion axis 32 is parallel with, but spaced apart from, crankcase axis 15. It will be appreciated that pinion assembly 30 may be coupled to a power source (not shown) to drive power end 10.

In one or more embodiments, crankcase 12 may include one or more eye flanges 34. In the illustrated embodiment, each first side 20 includes a forward eye flange 34a and a rear eye flange 34b, and second side 22 likewise includes a forward eye flange 34a and a rear eye flange 34b. Crankcase 12 may further include one or more access covers 36. In the illustrated embodiment, five upper access covers 36a are shown. An oil port 37 is shown formed in gearbox housing 25.

Figure 2A:
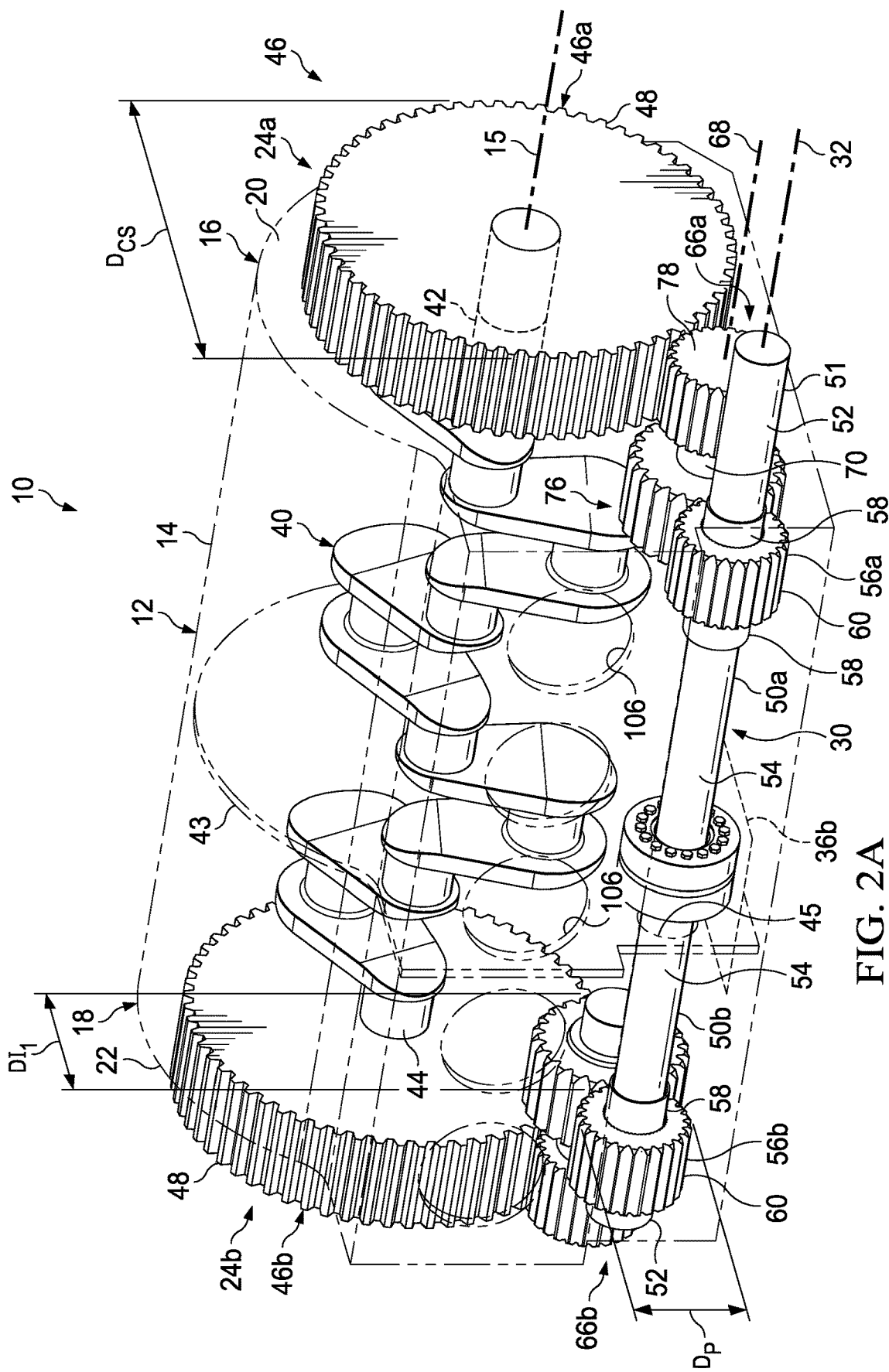
FIG. 2A is a perspective view of the gearing arrangement of the power end of the hydraulic fracturing pump of FIG. 1.
Figure 2B:
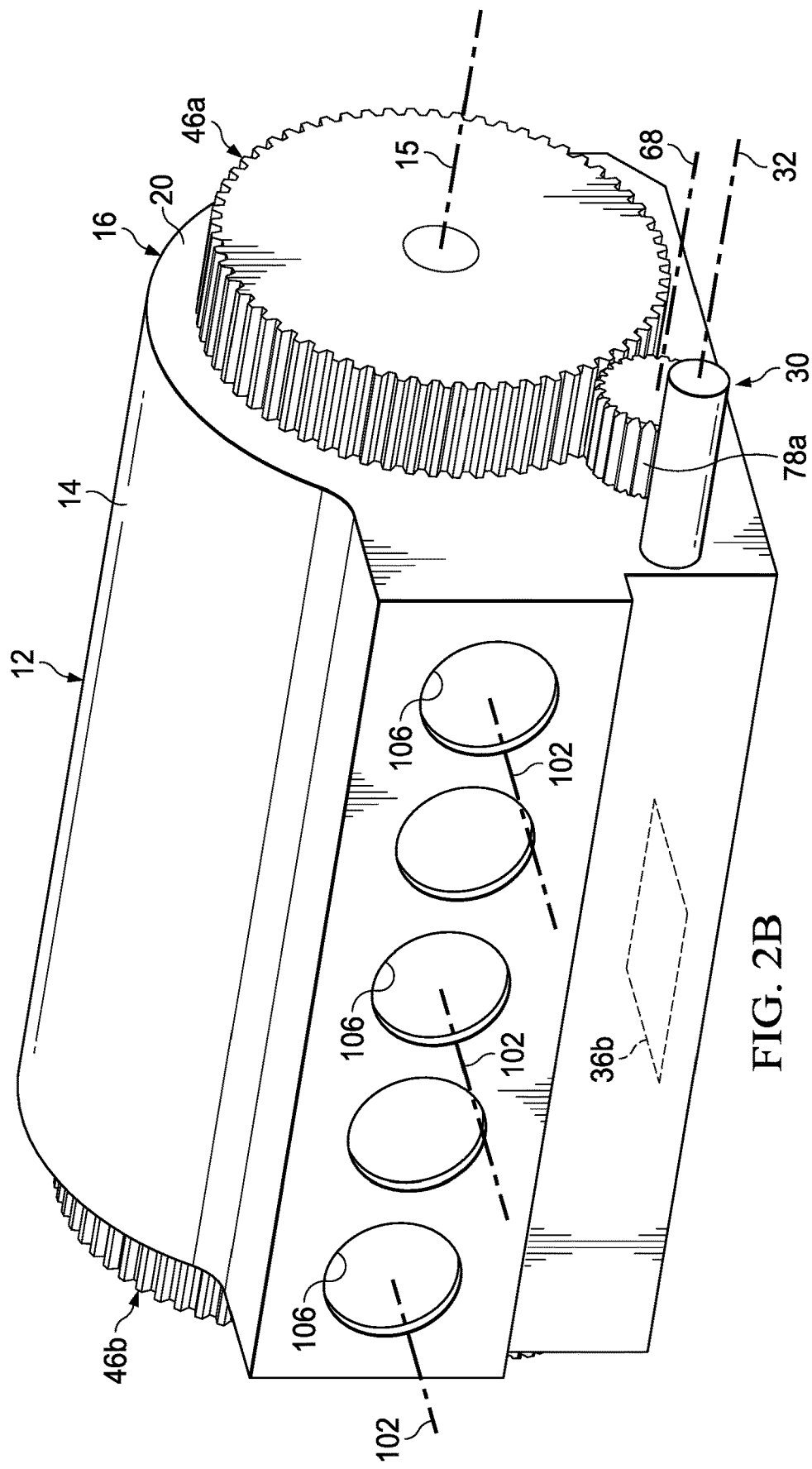
FIG. 2B is a perspective view of the power end crankcase of the hydraulic fracturing pump of FIG. 1.
Figure 2C:
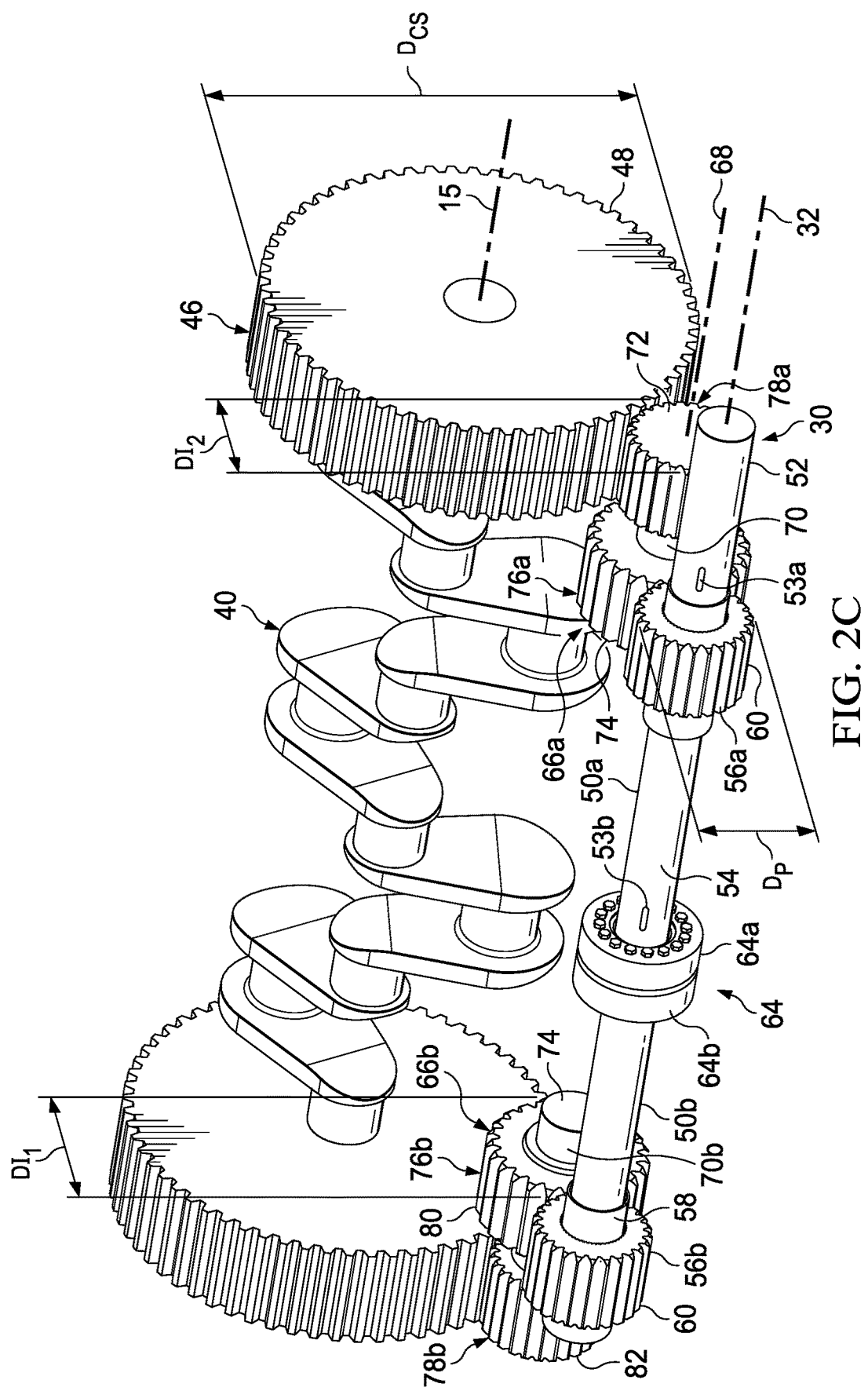
FIG. 2C is a perspective view of the drive train of a hydraulic fracturing pump system according to embodiments of the present disclosure of FIG. 2A.

Turning to FIGS. 2A, 2B and 2C, a crankshaft 40 is shown extending along the crankcase axis 15 from a first crankshaft end 42 to a second crankshaft end 44. For illustrative purposes only, crankshaft 40 may be depicted or referred to as an elongated shaft, but it will be appreciated that in one or more embodiments, crankshaft may have the typical construction known in the industry with main journals and axially offset crankpin journals. In some embodiments, crankcase 12 may include one or more substantially vertical ribs 43 through which crankshaft 40 passes. FIGS. 2A, 2B and 2C further illustrate additional details of gearbox assembly 24 and pinion assembly 30. Thus, gearbox assembly 24 includes a crankshaft gear 46 mounted on each end 42, 44 of crankshaft 40. In one or more embodiments, crankshaft gear 46 is a bull gear. In the illustration, a first crankshaft gear 46a is mounted on the first end 42 of crankshaft 40 and a second crankshaft bear 46b is mounted on the second end 44 of crankshaft 40. Although crankshaft gears 46a, 46b could be mounted to be within crankcase 12, and thus eliminating the need for a gearbox housing 25, in the illustrated embodiment, crankshaft 40 extends through the sides 20, 22 of crankcase 12 and crankshaft gears 46a, 46b are external to crankcase 12. Each crankshaft gear 46 has a crankshaft gear diameter $D_{CS}$ and teeth 48. In one or more embodiments, teeth 48 are disposed about an outer periphery of crankshaft gear 46, while in other embodiments, crankshaft gear 46 may be a ring gear with teeth 48 disposed around an inner periphery crankshaft gear 46.

Pinion assembly 30 is shown as having a first pinion shaft 50a and a second pinion shaft 50b extending along pinion axis 32 so as to be coaxial with one another. The pinion shafts 50a, 50b are parallel with but spaced apart from crankcase axis 15. As such, pinion shafts 50a, 50b may also pass through ribs 43. In this regard, ribs 43 may have apertures 45 through which shafts 50 pass. Each pinion shaft 50 has a first end 52 and a second end 54 with an input pinion gear 56 disposed along each pinion shaft 50 adjacent the first end 52 of each pinion shaft 50. In the illustrated embodiment, input pinion gear 56a is disposed along pinion shaft 50a and input pinion gear 56b is disposed along pinion shaft 50b. In one or more embodiments, pinion gear 56 may be integrally formed as part of pinion shaft 50, while in other embodiments, pinion gear 56 may be a separately mounted gear. Although not limited to a particular type of gear or mounting mechanism, in some embodiments, pinion gear 56 may be a spur gear mounted with a key joint (not shown).

Bearings 58 may be provided along pinion shaft 50 to support pinion shaft 50. In the illustrated embodiment, bearings 58 are provided on either side of each pinion gear 56.

Each pinion gear 56 has a pinion gear diameter $D_P$ and teeth 60. In one or more embodiments, each pinion gear 56 is disposed inside of crankcase 12 which allows pinion gears 56a, 56b to be lubricated by crankcase lubricant (not shown). Moreover, the first end 52 of each pinion shaft 50 protrudes from the crankcase 12. In one or more embodiments, at least one and preferably both first end 52 of the respective pinion shafts 50a, 50b protrude from crankcase 12, thereby allowing pinion assembly 30 to be driven at both ends. In this regard, an input shaft 51 may be provided that couples to the first end 52 of a pinion shaft 50 for engagement by a power source (not shown).

Finally, one or both pinion shafts 50 may include an index 53 at one or both ends 52, 54. In one or more embodiments, a first index 53a is provided at the first end 52 protruding from crankcase 12 and a second index 53b is provided at the second end 54 of each pinion shaft 50a, 50b to permit alignment and adjustment between adjacent pinion shafts 50a, 50b.

Pinion assembly 30 also includes a coupler 64 coupling together the first and second pinion shafts 50a, 50b at their respective second ends 54. Coupler 64 may have a first coupler portion 64a that can engage end 54 of pinon shaft 50a and a second coupler portion 64b that can engage end 54 of pinion shaft 50b, thereby allowing the two pinion shafts 50a, 50b to be coupled together. In one or more embodiments, coupler 64 is a keyless coupler. In this regard, keyless coupler 64 may be any keyless locking device (KLD) known in the industry that utilizes mechanical bushings to frictionally engage the first and second pinion shafts 50a, 50b (as opposed to keys). In some embodiments, the first coupler portion 64a and second coupler portion 64b of keyless coupler 64 may be a first collar 64a and a second collar 64b that are disposed to engage one another to effectuate frictional engagement of the collars 64a, 64b with their respective pinion shafts 50a, 50b.

It will be appreciated that in power ends of the prior art, a single pinion shaft extending through internal ribs and between sides of a crankcase is commonly utilized. This prior art pinion shaft typically has a large pinion gear mounted on each end and must be installed by passing one end of the pinion shaft, with a pinion gear mounted thereon, through the width of the crankcase. As such, openings in the internal ribs of the power end must be sufficiently large to allow the pinion shaft with the pinion gear to be passed therethrough. The larger openings in the ribs in turn can have a negative impact on their strength and rigidity.

In addition to the foregoing drawback, prior art power ends such as described are difficult to assemble in order to minimize backlash at one or both pinion gears. While it is most desirable that backlash at both pinion gears is minimized, traditionally, in such prior art power ends, it is difficult to achieve such an optimal alignment at both pinion gears due to the single-shaft pinion design and the difficulty in accessing the pinion gears once installed to make fine radial adjustment necessary for optimized alignment. Typically, such an adjustment to a gear is made by radially rotating the gear and then locking the gear on the shaft at the desired angular position with a shaft key. However, because both gears are mounted on a single shaft, it is often difficult to achieve optimized alignment even if access to both gears are accessible because the alignment of one gear is dependent on the alignment of the other gear on the single shaft. More commonly, one pinion gear may be optimally aligned while the other pinion gear is not. Even to achieve optimal alignment, one must have a high degree of access to the pinion gear and key to make such adjustments. Finally, because each pinion gear will likely need radial adjust to minimize backlash, the pinion gears in these prior art systems cannot be integrally formed on the pinion shaft, since they will likely require radial adjustment.

In contrast, the separate pinion shafts 50a, 50b of the disclosure allow each pinion shaft 50a, 50b to be separately rotated in order to independently adjust the backlash of each pinion gear 56a, 56b. Once the desired alignment on each gear is achieved, then the first coupler portion 64a mounted on pinon shaft 50a can be engaged with and secured to the second coupler portion 64b mounted on pinon shaft 50b. In one or more embodiments, it will be appreciated that coupler 64 is a keyless coupler to obviate the need for any radial rotation of the first coupler portion 64a relative to the second coupler portion 64b in order to secure the coupler portions 64a, 64b to one another, it being understood that any such radial rotation could in turn impact the optimized alignment of the pinion gears 56a, 56b. In any event, it will be appreciated that such an arrangement permits backlash of each pinion gear 56 to be easily adjustable.

Furthermore, because each pinion shaft 50 can be rotated independently in order to make backlash adjustments, the pinion gears 56 themselves can be integrally formed as part of pinion shaft 50. Even if not integrally formed, a pinion gear 56 may be rigidly secured to a pinion shaft 50 utilizing fasteners that are less likely to slip or become loose over time.

Moreover, in one or more embodiments as shown in FIGS. 2A and 2B, a movable coupler access panel 36b may be provided in crankcase 12 adjacent coupler 64, such as in the bottom of crankcase 12 or the back of crankcase 12, which can be opened in order to permit coupler portions 64a, 64b to be accessed for securing to one another. In this regard, in some embodiments, pinion shafts 50a, 50b may be approximately the same length, with coupler access cover 36b centrally located. Furthermore, such embodiments with a removable coupler access panel 36b will also permit apertures 45 in ribs 43 to be minimized wherein pinion shafts 50 pass through the ribs 43. Specifically, such embodiments, first and second coupler portions 64a, 64b can be attached to shafts 50a, 50b once shafts 50a, 50b, have been installed by passing the smaller diameter end 54 of the shaft 50 through the apertures 45 and then utilizing removable coupler access panel 36b to install first and second coupler portions 64a, 64b on their respective shaft ends 54 once the pinion shafts 50a, 50b have been positioned in crankcase 12. This permits each shaft 50 to be installed through the sides 20, 22 of crankcase 12 without the need to pass a larger diameter pinion gear 56 through an aperture 45 in a rib 43. Thus, the diameters of apertures 45 in ribs 43 can be minimized.

In some embodiments, gearbox assembly 24 further includes at least one intermediate gear assembly 66. In the illustrated embodiment, a first intermediate gear assembly 66a is shown adjacent the first end 16 of crankcase housing 14 and a second intermediate gear assembly 66b is shown adjacent the second end 18 of crankcase housing 14. Each intermediate gear assembly 66 extends along an intermediate axis 68. Intermediate axis 68 is parallel with, but spaced apart from, both crankcase axis 15 and pinion axis 32. In one or more embodiments, first and second intermediate gear assemblies 66a, 66b are coaxial with one another. Each intermediate assembly 66 includes an intermediate shaft 70 extending along the intermediate axis 68 between a first end 72 and a second end 74 of the intermediate shaft 70. In the illustrated embodiment, a first intermediate shaft 70a is shown adjacent the first end 16 of crankcase housing 14 and a second intermediate shaft 70b is shown adjacent the second end 18 of crankcase housing 14, with the intermediate shafts 70a, 70b coaxially aligned but spaced apart from one another. In some embodiments, a single intermediate shaft 70 may extend between the two ends 16, 18 of crankcase housing 14.

Each intermediate gear assembly 66 further includes a first intermediate gear 76 adjacent the first end 72 of intermediate shaft 70 and a second intermediate gear 78 adjacent the second end 74 of intermediate shaft 70. One or both intermediate gears 76, 78 may be integrally formed with intermediate shaft 70 or one or both intermediate gears 76, 78 may be separate gears mounted on intermediate shaft 70. Although not limited to a particular type of gear or mounting mechanism, in some embodiments, one or both intermediate gears 76, 78 may be spur gears mounted with a key joint (not shown). In some embodiments, second intermediate gear 78 may be integrally formed with intermediate shaft 70, while first intermediate gear 76 is a separate gear mounted on intermediate shaft 70 adjacent the first end 72 of intermediate shaft 70. Each first intermediate gear 76 has a diameter $DI_1$ and teeth 80, while each second intermediate gear 78 has a diameter $DI_2$ and teeth 82. In one or more embodiments, the diameter $DI_1$ of first intermediate gear 76 is larger than the diameter $DI_2$ of second intermediate gear 78. In some embodiments, the diameter $DI_2$ of second intermediate gear 78 may be larger than the pinion gear diameter $D_P$. In some embodiments, the diameter $DI_2$ of second intermediate gear 78 may be the same as the pinion gear diameter $D_P$. Although one or both intermediate gears 76, 78 can be within or outside of the crankcase housing 14, in the illustrated embodiment, the first intermediate gear 76 is disposed within the crankcase 12 and the second intermediate gear 78 is disposed outside of crankcase 12. In one or more embodiments, the pinion gear 56 and the second intermediate gear 78 have the same number of teeth. In one or more embodiments, the pinion gear 56 has fewer teeth than the first intermediate gear 76.

First intermediate gear 76 meshes with pinion gear 56 while second intermediate gear 78 meshes with crankshaft gear 46. It will be appreciated that by utilizing the above described arrangement with three parallel shafts, namely a pinion shaft 50, an intermediate shaft 70 and the crankshaft 40 with gears mounted on each shaft, the teeth of any one gear can be increased in size so as to lessen the impact of backlash on the overall gearing arrangement while maintaining the same footprint as prior art power ends. In this regard, backlash can be more readily adjusted by manipulation of coupler 64, as opposed to trying to make adjustments at the key joint of a gear. As can be seen in the figure, the first intermediate gear 76 may have a greater number of teeth per inch than the second intermediate gear 78.

As described above, the forgoing gears are not limited to a particular type of gear, and may include, but are not limited to, straight cut gears and helical gears.

As described herein, power end 10 of a hydraulic fracturing pump may be coupled with any hydraulic fracturing pump fluid end and will provide greater overall integrity to the hydraulic fracturing pump during operation.

Figure 3:
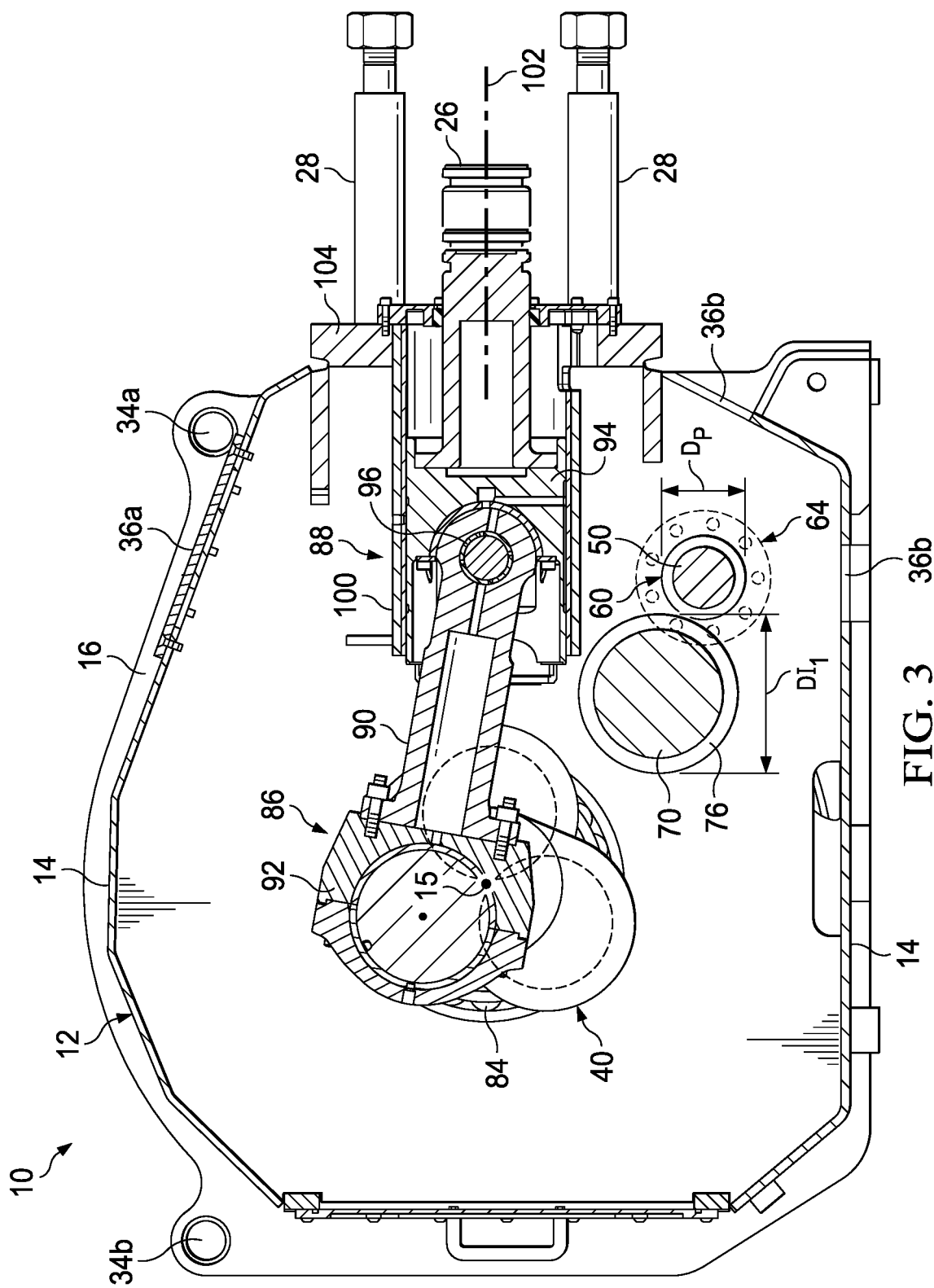
FIG. 3 is a cut-away side view of a hydraulic fracturing pump system according to embodiments of the present disclosure.

FIG. 3 is a cut-away side view of crankcase 12. Crankcase housing 14 is shown enclosing crankshaft 40, which extends along crankcase axis 15. Crankshaft 40 is supported by bearings 84. A piston rod assembly 86 is shown interconnecting crankshaft 40 with a crosshead assembly 88. Specifically, piston rod assembly 86 has a piston arm 90 which is pivotally coupled to crankshaft 40 at a first end 92 of piston arm 90, and is pivotally coupled to, a crosshead 94 of crosshead assembly 88 at a second end 96 of piston arm 90 by a connecting pin 98. Crosshead 94 is restrained by crosshead guides 100 to move reciprocally along crosshead axis 102. Crosshead 94 is attached to crosshead extension rod 26. Crankcase housing 14 may further include a rod seal plate 104 supporting crosshead assembly 88, wherein one or more crosshead apertures 106 are formed in rod seal plate 104, each crosshead aperture 106 being generally coaxial with a crosshead axis 102. As illustrated in FIG. 3, portions of crankshaft 40 to which a first end 92 of a piston arm 90 is attached may be offset from crankcase axis 15 in the typical manner of crankshafts.

Figure 4A:
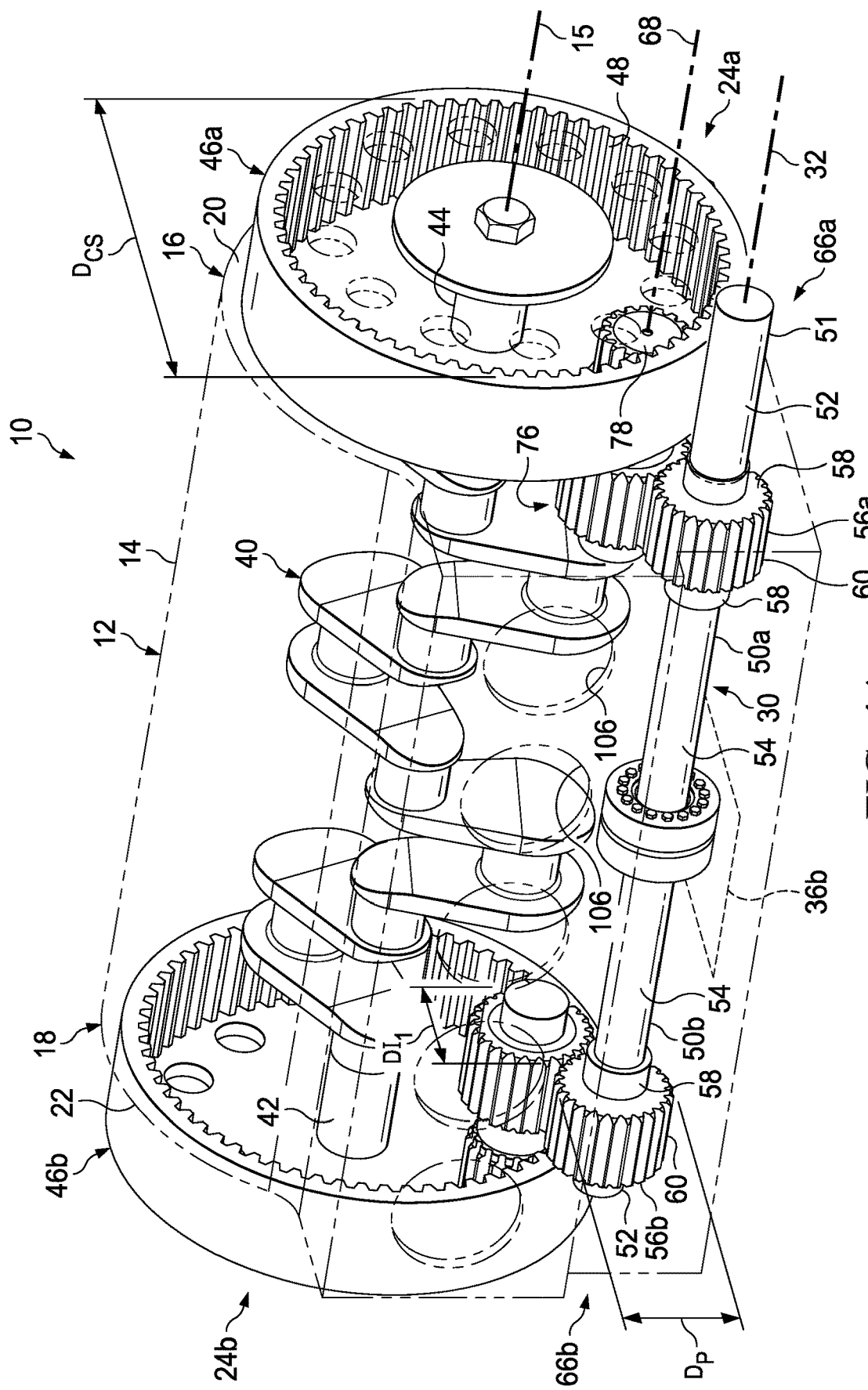
FIG. 4A is a perspective view of another embodiment of the gearing arrangement of the power end of a hydraulic fracturing pump system according to embodiments of the present disclosure.
Figure 4B:
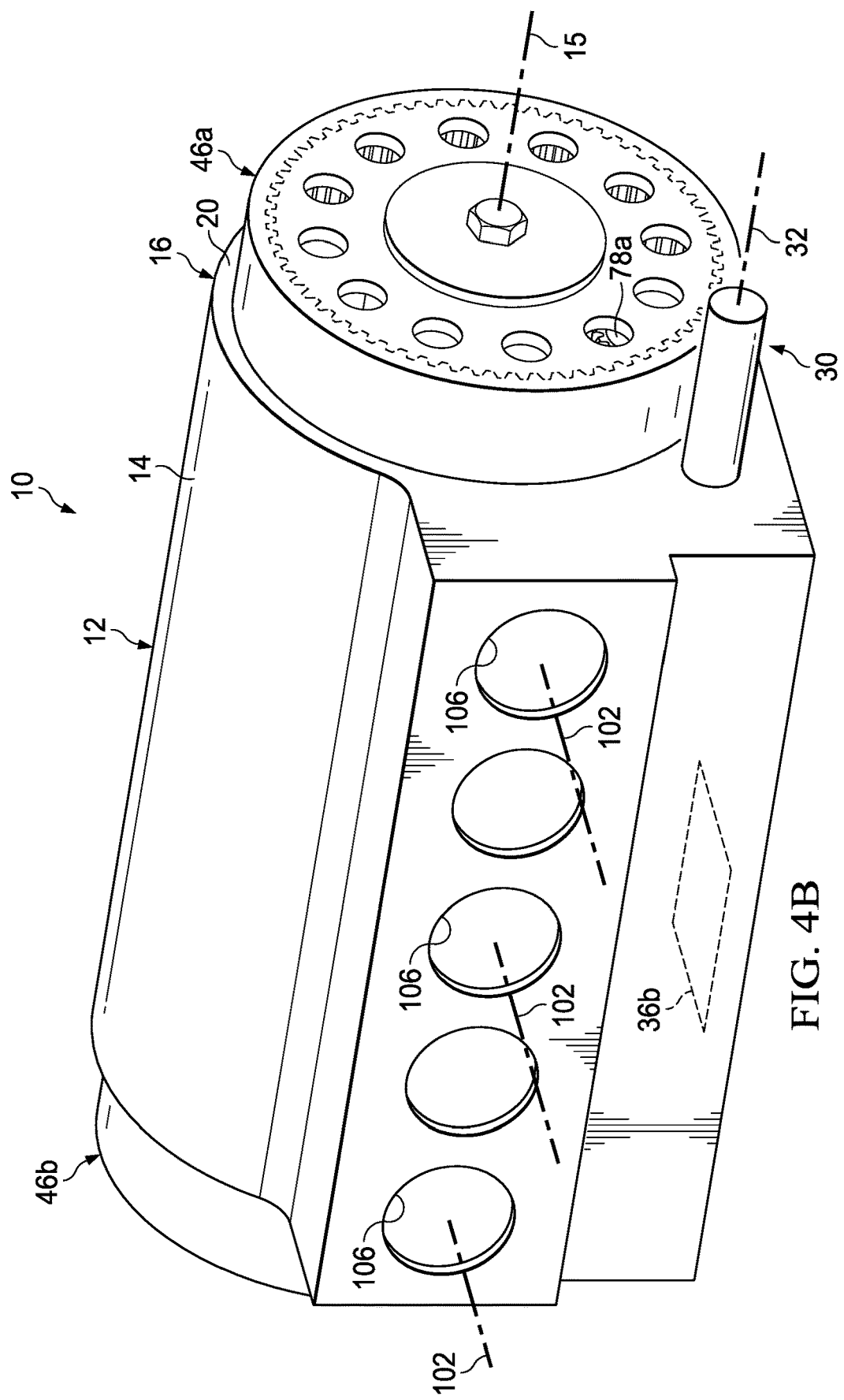
FIG. 4B is a perspective view of the power end crankcase of a hydraulic fracturing pump system according to embodiments of the present disclosure of FIG. 4A.
Figure 4C:
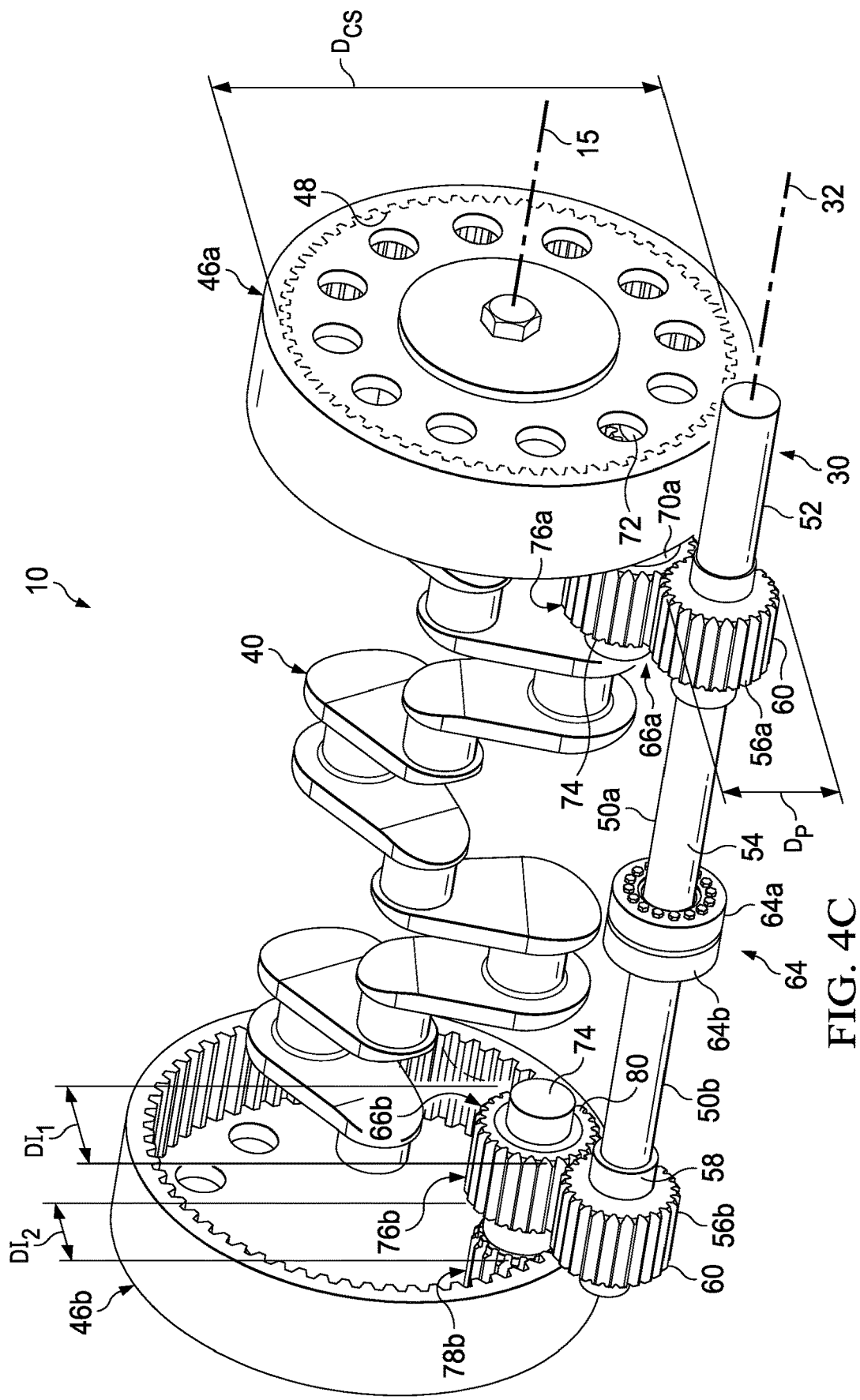
FIG. 4C is a perspective view of the drive train of a hydraulic fracturing pump system according to embodiments of the present disclosure of FIG. 4A.

FIGS. 4A, 4B and 4C are the same as FIGS. 2A, 2B and 2C, but where crankshaft gear 46 is a ring gear with teeth 48 disposed around an inner periphery crankshaft gear 46. Thus, a crankshaft 40 is shown extending along the crankcase axis 15 from a first crankshaft end 42 to a second crankshaft end 44 with a crankshaft gear 46 mounted on each end 42, 44 of crankshaft 40, each crankshaft gear 46 being part of the gearbox assembly 24 positioned adjacent each end 42, 44 of crankshaft 40. A pinion assembly 30 having a pinion gear 56 is illustrated as axially spaced apart from crankshaft 40 with an intermediate gear assembly 76 to interconnect crankshaft gear 46 with pinon gear 56.

In the illustration, a first crankshaft gear 46a is mounted on the first end 42 of crankshaft 40 and a second crankshaft bear 46b is mounted on the second end 44 of crankshaft 40. Each crankshaft gear 46 has a crankshaft inner gear diameter $D_{CS}$ and teeth 48. In the illustrated embodiment, crankshaft gear 46 is a ring gear with teeth 48 disposed along an inner periphery crankshaft gear 46.

Pinion assembly 30 is shown as having a first pinion shaft 50a and a second pinion shaft 50b extending along pinion axis 32 so as to be coaxial with one another. The pinion shafts 50a, 50b are parallel with but spaced apart from crankcase axis 15. Each pinion shaft 50 has a first end 52 and a second end 54 with an input pinion gear 56 disposed along each pinion shaft 50 adjacent the first end 52 of each pinion shaft 50. In the illustrated embodiment, input pinion gear 56a is disposed along pinion shaft 50a and input pinion gear 56b is disposed along pinion shaft 50b. In one or more embodiments, pinion gear 56 may be integrally formed as part of pinion shaft 50, while in other embodiments, pinion gear 56 may be a separately mounted gear. Although not limited to a particular type of gear or mounting mechanism, in some embodiments, pinion gear 56 may be a spur gear mounted with a key joint (not shown).

Bearings 58 may be provided along pinion shaft 50 to support pinion shaft 50. In the illustrated embodiment, bearings 58 are provided on either side of each pinion gear 56.

Each pinion gear 56 has a pinion gear diameter $D_P$ and teeth 60. In one or more embodiments, each pinion gear 56 is disposed inside of crankcase 12 which allows pinion gears 56a, 56b to be lubricated by crankcase lubricant (not shown). Moreover, the first end 52 of each pinion shaft 50 protrudes from the crankcase 12. In one or more embodiments, at least one and preferably both first end 52 of the respective pinion shafts 50a, 50b protrude from crankcase 12, thereby allowing pinion assembly 30 to be driven at both ends. In this regard, an input shaft 51 may be provided that couples to the first end 52 of a pinion shaft 50 for engagement by a power source (not shown).

Finally, one or both pinion shafts 50 may include an index 53 at one or both ends 52, 54. In one or more embodiments, a first index 53a is provided at the first end 52 protruding from crankcase 12 and a second index 53b is provided at the second end 54 of each pinion shaft 50a, 50b to permit alignment and adjustment between adjacent pinion shafts 50a, 50b.

Pinion assembly 30 also includes a coupler 64 coupling together the first and second pinion shafts 50a, 50b at their respective second ends 54. Coupler 64 may have a first coupler portion 64a that can engage end 54 of pinon shaft 50a and a second coupler portion 64b that can engage end 54 of pinion shaft 50b, thereby allowing the two pinion shafts 50a, 50b to be coupled together. In one or more embodiments, coupler 64 is a keyless coupler. In this regard, keyless coupler 64 may be any keyless locking device (KLD) known in the industry that utilizes mechanical bushings to frictionally engage the first and second pinion shafts 50a, 50b (as opposed to keys). In some embodiments, the first coupler portion 64a and second coupler portion 64b of keyless coupler 64 may be a first collar 64a and a second collar 64b that are disposed to engage one another to effectuate frictional engagement of the collars 64a, 64b with their respective pinion shafts 50a, 50b.

It will be appreciated that by utilizing a keyless coupler 64 as described, it is possible to achieve a higher degree of accuracy in minimizing backlash than may otherwise be possible with other types of couplers. This is particularly desirable for hydraulic fracturing pumps where the pumps tend to operate for extended periods of time where backlash could significantly reduce the operating life of such pumps. In any event, the separate pinion shafts 50a, 50b of the disclosure allow each pinion shaft 50a, 50b to be separately rotated in order to independently adjust the backlash of each pinion gear 56a, 56b. Once the desired alignment on each gear is achieved, then the first coupler portion 64a mounted on pinon shaft 50a can be engaged with and frictionally secured to the second coupler portion 64b mounted on pinon shaft 50b. It will be appreciated that coupler 64 is a keyless coupler to obviate the need for any radial rotation of the first coupler portion 64a relative to the second coupler portion 64b in order to secure the coupler portions 64a, 64b to one another. In any event, it will be appreciated that such an arrangement permits backlash of each pinion gear 56 on each pinion shaft 50a, 50b to be easily adjustable.

Furthermore, because each pinion shaft 50 can be rotated independently in order to make backlash adjustments, the pinion gears 56 themselves can be integrally formed as part of pinion shaft 50.

Moreover, in one or more embodiments as shown in FIGS. 4A and 4B, a removable coupler access panel 36b may be provided in crankcase 12 adjacent coupler 64, such as in the bottom of crankcase 12 or the back of crankcase 12 in order to permit coupler portions 64a, 64b to be accessed for securing to one another.

In the illustrated embodiment, a first intermediate gear assembly 66a is shown adjacent the first end 16 of crankcase housing 14 and a second intermediate gear assembly 66b is shown adjacent the second end 18 of crankcase housing 14. Each intermediate gear assembly 66 extends along an intermediate axis 68. Intermediate axis 68 is parallel with, but spaced apart from, both crankcase axis 15 and pinion axis 32. In one or more embodiments, first and second intermediate gear assemblies 66a, 66b are coaxial with one another. Each intermediate assembly 66 includes an intermediate shaft 70 extending along the intermediate axis 68 between a first end 72 and a second end 74 of the intermediate shaft 70. In the illustrated embodiment, a first intermediate shaft 70a is shown adjacent the first end 16 of crankcase housing 14 and a second intermediate shaft 70b is shown adjacent the second end 18 of crankcase housing 14, with the intermediate shafts 70a, 70b coaxially aligned but spaced apart from one another. In some embodiments, a single intermediate shaft 70 may extend between the two ends 16, 18 of crankcase housing 14.

Each intermediate gear assembly 66 further includes a first intermediate gear 76 adjacent the first end 72 of intermediate shaft 70 and a second intermediate gear 78 adjacent the second end 74 of intermediate shaft 70. One or both intermediate gears 76, 78 may be integrally formed with intermediate shaft 70 or one or both intermediate gears 76, 78 may be separate gears mounted on intermediate shaft 70. Although not limited to a particular type of gear or mounting mechanism, in some embodiments, one or both intermediate gears 76, 78 may be spur gears mounted with a key joint (not shown). In some embodiments, second intermediate gear 78 may be integrally formed with intermediate shaft 70, while first intermediate gear 76 is a separate gear mounted on intermediate shaft 70 adjacent the first end 72 of intermediate shaft 70. Each first intermediate gear 76 has a diameter $DI_1$ and teeth 80, while each second intermediate gear 78 has a diameter $DI_2$ and teeth 82. In one or more embodiments, the diameter $DI_1$ of first intermediate gear 76 is larger than the diameter $DI_2$ of second intermediate gear 78. In some embodiments, the diameter $DI_2$ of second intermediate gear 78 may be larger than the pinion gear diameter $D_P$. In some embodiments, the diameter $DI_2$ of second intermediate gear 78 may be the same as the pinion gear diameter $D_P$. Although one or both intermediate gears 76, 78 can be within or outside of the crankcase housing 14, in the illustrated embodiment, the first intermediate gear 76 is disposed within the crankcase 12 and the second intermediate gear 78 is disposed outside of crankcase 12. In one or more embodiments, the pinion gear 56 and the second intermediate gear 78 have the same number of teeth. In one or more embodiments, the pinion gear 56 has fewer teeth than the first intermediate gear 76.

First intermediate gear 76 meshes with pinion gear 56 while second intermediate gear 78 meshes with crankshaft gear 46. It will be appreciated that by utilizing the above described arrangement with three parallel shafts, namely a pinion shaft 50, an intermediate shaft 70 and the crankshaft 40 with gears mounted on each shaft, the teeth of any one gear can be increased in size so as to lessen the impact of backlash on the overall gearing arrangement while maintaining the same footprint as prior art power ends. In this regard, backlash can be more readily adjusted by manipulation of coupler 64, as opposed to trying to make adjustments at the key joint of a gear. As can be seen in the figure, the first intermediate gear 76 may have a greater number of teeth per inch than the second intermediate gear 78.

As described above, the forgoing gears are not limited to a particular type of gear, and may include, but are not limited to, straight cut gears and helical gears.

Thus, a hydraulic fracturing pump has been described. The hydraulic fracturing pump may include a crankcase housing formed along a crankcase axis, the crankcase housing further having a plurality of crosshead apertures formed in the crankcase housing, each crosshead aperture formed about a crosshead axis that is generally perpendicular to the crankcase axis; a crankshaft extending along the crankcase axis from a first end to a second end; a plurality of piston arms spaced apart from one another along the crankshaft; and a corresponding plurality of crossheads; wherein each piston arm pivotally coupled to the crankshaft at a first end of piston arm, and each piston arm pivotally coupled to a crosshead at a second end of the piston arm, each crosshead reciprocal along a crosshead axis; a crankshaft gear mounted on each end of the crankshaft; a pinion assembly extending along a pinion axis extending between the first end and second end of the crankcase housing, the pinion axis parallel with, but spaced apart from the crankcase axis, the pinion assembly having a first pinion shaft extending along the pinion axis between a first end and a second end of the first pinion shaft, a second pinion shaft extending along the pinion axis between a first end and a second end of the second pinion shaft, an input pinion gear disposed along each pinion shaft adjacent the first end of each pinion shaft, and a keyless coupler interconnecting the second ends of the first and second pinion shafts. In other embodiments, the hydraulic fracturing pump may include a crankcase housing formed along a crankcase axis, the crankcase housing further having a plurality of crosshead apertures formed in the crankcase housing, each crosshead aperture formed about a crosshead axis that is generally perpendicular to the crankcase axis; a crankshaft extending along the crankcase axis from a first end to a second end; a plurality of piston arms spaced apart from one another along the crankshaft; and a corresponding plurality of crossheads; wherein each piston arm pivotally coupled to the crankshaft at a first end of piston arm, and each piston arm pivotally coupled to a crosshead at a second end of the piston arm, each crosshead reciprocal along a crosshead axis; a crankshaft gear mounted on each end of the crankshaft; a pinion assembly extending along a pinion axis extending between the first end and second end of the crankcase housing, the pinion axis parallel with, but spaced apart from the crankcase axis, the pinion assembly having a first pinion shaft extending along the pinion axis between a first end and a second end of the first pinion shaft, a second pinion shaft extending along the pinion axis between a first end and a second end of the second pinion shaft, an input pinion gear disposed along each pinion shaft adjacent the first end of each pinion shaft, and a keyless coupler interconnecting the second ends of the first and second pinion shafts; first and second intermediate gear assemblies, each intermediate gear assembly extending along an intermediate axis extending parallel with, but spaced apart from the crankcase axis and the pinion axis, each intermediate assembly having an intermediate shaft extending along the intermediate axis between a first end and a second end of the intermediate shaft, each intermediate assembly further having a first intermediate gear mounted adjacent the first end of the intermediate shaft and a second intermediate gear mounted adjacent the second end of the intermediate shaft, the first intermediate gear meshed with an input pinion gear and the second intermediate gear meshed with a crankshaft gear. In other embodiments, the hydraulic fracturing pump may include a crankcase housing having a first side and a second side, the crankcase housing formed along a crankcase axis extending between the two sides, the crankcase housing further having a plurality of crosshead apertures formed in the crankcase housing, each crosshead aperture formed about a crosshead axis that is generally perpendicular to the crankcase axis; a crankshaft extending along the crankcase axis from a first end to a second end; a plurality of piston arms spaced apart from one another along the crankshaft; and a corresponding plurality of crossheads; wherein each piston arm pivotally coupled to the crankshaft at a first end of piston arm, and each piston arm pivotally coupled to a crosshead at a second end of the piston arm, each crosshead reciprocal along a crosshead axis; a first pinion shaft and a second pinion shaft coupled together by a keyless coupler, the first and second pinion shafts extending along a pinion axis that is parallel with but spaced apart from the crankcase axis; and a first intermediate shaft and a second intermediate shaft coaxial with the first intermediate shaft along an intermediate axis, but spaced apart from one another, the intermediate axis parallel with but spaced apart from the pinion axis and the crankcase axis.

For any of the foregoing embodiments, the hydraulic fracturing pump may include any one of the following elements, alone or in combination with each other:

The input pinion gear is integrally formed on the pinion shaft.

The input pinion gear is mounted on the pinion shaft.

The second intermediate gear is integrally formed on the intermediate shaft adjacent the second end.

The second intermediate gear is mounted on the intermediate shaft adjacent the second end.

One of the intermediate gears is mounted on the intermediate shaft and the other intermediate gear is integrally formed on the intermediate shaft.

Both of the intermediate gears are mounted on the intermediate shaft at their respective ends.

Both of the intermediate gears are integrally formed on the intermediate shaft.

The crankshaft gear comprises teeth disposed about the outer periphery of the gear.

The crankshaft gear comprises a ring gear with teeth disposed about the inner periphery of the ring gear.

One or more gears are straight cut gears.

One or more gears are helical gears.

The first end of each pinion shaft protrudes from the crankcase.

A first index on the first end of the pinion shaft and a second index on the second end of the pinion shaft.

A first index on the first end of each pinion shaft and a second index on the second end of each pinion shaft.

The first intermediate gear is disposed within the crankcase and the second intermediate gear is disposed outside the crankcase.

The first intermediate gear has a larger diameter than the second intermediate gear.

The keyless coupler is a keyless locking device.

An input shaft engaging the first end of at least one of the pinion shafts.

A pinion assembly extending along a pinion axis extending between the first end and second end, the pinion assembly having a first pinion shaft extending along the pinion axis between a first end and a second end of the first pinion shaft, a second pinion shaft extending along the pinion axis between a first end and a second end of the second pinion shaft, an input pinion gear disposed along each pinion shaft adjacent the first end of each pinion shaft, and a keyless coupler interconnecting the second ends of the first and second pinion shafts.

A crankcase housing having a first side at a first end of the crankcase housing and a second side at a second end of the crankcase housing, an upper surface extending between the first and second sides and a base and, the crankcase housing formed along a crankcase axis extending between the two ends, the crankcase housing further having a plurality of crosshead apertures formed in the crankcase housing, each crosshead aperture formed about a crosshead axis that is generally perpendicular to the crankcase axis.

A crankshaft aperture formed in the first side of the crankshaft housing.

A pinion aperture formed in the first side of the crankshaft housing about a pinion axis that is generally parallel with the crankshaft axis.

A pinion aperture formed in the first side and the second side of the crankshaft housing, the pinion apertures formed about a pinion axis that is generally parallel with the crankshaft axis with the coupled pinion shafts extending between the pinion apertures.

A crankshaft extending along the crankcase axis; a piston arm pivotally coupled to the crankshaft at a first end of piston arm, the piston arm pivotally coupled to a crosshead at a second end of the piston arm, the crosshead reciprocal along the crosshead axis.

A plurality of piston arms spaced apart from one another along the crankshaft and a corresponding plurality of crossheads, each piston arm pivotally coupled to the crankshaft at a first end of piston arm, and each piston arm pivotally coupled to a crosshead at a second end of the piston arm, each crosshead reciprocal along a crosshead axis.

A crosshead extension rod fastened to each crosshead and extending through a crosshead aperture.

The crosshead apertures are formed in rod seal plate adjacent the crosshead.

A fluid end of a hydraulic fracturing pump coupled to the power end of the hydraulic fracturing pump.

Crosshead axis perpendicularly intersects crankcase axis.

A plurality of gears interconnecting the pinion shafts, the intermediate shafts and the crankshaft adjacent each of the two sides.

At least 4 gears interconnecting the pinion shafts, the intermediate shafts and the crankshaft adjacent each of the two sides.

The plurality of gears comprising a crankshaft gear, a pinion gear and two intermediate gears.

The diameter of the crankshaft gear is larger than the diameter of the intermediate gears and pinion gear.

The diameter of the intermediate gear engaging the pinion gear is larger than the diameter of the intermediate gear engaging the driveshaft gear.

The diameter of the first intermediate gear is larger than the diameter of the second intermediate gear.

The diameter of the pinion gear is the same as the diameter of the second intermediate gear.

The pinion gear and the second intermediate gear have the same number of teeth.

An opening in the crankcase adjacent the keyless coupler.

The pinion gear has fewer teeth than the first intermediate gear

Although various embodiments have been shown and described, the disclosure is not limited to such embodiments and will be understood to include all modifications and variations as would be apparent to one skilled in the art.

Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed:

1. A hydraulic fracturing pump comprising:
a crankcase housing having a first side and a second side, the crankcase housing formed along a crankcase axis extending between the two sides, the crankcase housing further having a plurality of crosshead apertures formed in the crankcase housing, each crosshead aperture formed about a crosshead axis that is generally perpendicular to the crankcase axis;
a crankshaft extending along the crankcase axis from a first end to a second end; a plurality of piston arms spaced apart from one another along the crankshaft; and a corresponding plurality of crossheads; wherein each piston arm is pivotally coupled to the crankshaft at a first end of a corresponding piston arm, and each piston arm pivotally is coupled to a crosshead at a second end of the piston arm, each crosshead moving reciprocal along a crosshead axis;
a first pinion shaft and a second pinion shaft coupled together by a coupler, the first and second pinion shafts extending along a pinion axis that is parallel with but spaced apart from the crankcase axis; and
a first intermediate shaft and a second intermediate shaft coaxial with the first intermediate shaft along an intermediate axis, but spaced apart from one another, the intermediate axis parallel with but spaced apart from the pinion axis and the crankcase axis and positioned between the pinion axis and the crankcase axis within the crankcase housing,
wherein the coupler is a frictional, keyless locking device.

2. The hydraulic fracturing pump of claim 1, further comprising further a plurality of gears interconnecting the pinion shafts, the intermediate shafts and the crankshaft wherein the plurality of gears comprises a crankshaft gear, a pinion gear mounted on each of the first and second pinion shafts and two intermediate gears mounted on each intermediate shaft adjacent each end of the crankshaft, wherein one intermediate gear on each intermediate shaft engages a pinion gear and the other intermediate gear on each intermediate shaft engages a crankshaft gear.

3. The hydraulic fracturing pump of claim 2, further comprising a power source coupled to a single input shaft connected to one of the first and second pinion shafts and used to drive both of the first and second pinion shafts.

4. A hydraulic fracturing pump comprising:
a crankcase housing having a first side at a first end of the crankcase housing and a second side at a second end of the crankcase housing, an upper surface extending between the first and second sides and a base and, the crankcase housing formed along a crankcase axis extending between the two ends, the crankcase housing further having a plurality of crosshead apertures formed in the crankcase housing, each crosshead aperture formed about a crosshead axis that is generally perpendicular to the crankcase axis;
a crankshaft extending along the crankcase axis from a first end to a second end; a plurality of piston arms spaced apart from one another along the crankshaft; and a corresponding plurality of crossheads; wherein each piston arm is pivotally coupled to the crankshaft at a first end of a corresponding piston arm, and each piston arm is pivotally coupled to a crosshead at a second end of the piston arm, each crosshead moving reciprocal along a crosshead axis;
a crankshaft gear mounted on each end of the crankshaft;
a pinion assembly extending along a pinion axis extending between the first end and second end of the crankcase housing, the pinion axis parallel with, but spaced apart from the crankcase axis, the pinion assembly having a first pinion shaft extending along the pinion axis between a first end and a second end of the first pinion shaft, a second pinion shaft extending along the pinion axis between a first end and a second end of the second pinion shaft, an input pinion gear disposed along each pinion shaft adjacent the first end of each pinion shaft;
a power source coupled to a single input shaft connected to one of the first and second pinion shafts and used to drive both of the first and second pinion shafts; and
a keyless coupler interconnecting the second ends of the first and second pinion shafts.

5. The hydraulic fracturing pump of claim 4, wherein the input pinion gear on each pinion shaft is integrally formed with its pinion shaft.

6. The hydraulic fracturing pump of claim 4, further comprising at least one intermediate shaft disposed along an intermediate axis and positioned between the pinion axis and the crankcase axis within the crankcase housing, the intermediate axis parallel with but spaced apart from the pinion axis and the crankcase axis; a first intermediate gear mounted on the intermediate shaft and a second intermediate gear mounted on the intermediate shaft, the first intermediate gear meshed with an input pinion gear and the second intermediate gear meshed with a crankshaft gear.

7. The hydraulic fracturing pump of claim 6, wherein the crankshaft gear comprises a ring gear with teeth disposed about the inner periphery of the ring gear.

8. The hydraulic fracturing pump of claim 6, wherein the first intermediate gear has a first diameter and the second intermediate gear has a second diameter smaller than the first diameter.

9. The hydraulic fracturing pump of claim 7, wherein the first intermediate gear has a first diameter and the second intermediate gear has a second diameter smaller than the first diameter.

10. The hydraulic fracturing pump of claim 4, wherein keyless coupler is a keyless locking device.

11. The hydraulic fracturing pump of claim 6, wherein the pinion gear and the second intermediate gear have the same number of teeth.

12. The hydraulic fracturing pump of claim 6, wherein the pinion gear has fewer teeth than the first intermediate gear.

13. The hydraulic fracturing pump of claim 4, further comprising a movable coupler access panel disposed in the crankcase housing adjacent the keyless coupler.

14. A hydraulic fracturing pump comprising:
a crankcase housing having a first side at a first end of the crankcase housing and a second side at a second end of the crankcase housing, an upper surface extending between the first and second sides and a base and, the crankcase housing formed along a crankcase axis extending between the two ends, the crankcase housing further having a plurality of crosshead apertures formed in the crankcase housing, each crosshead aperture formed about a crosshead axis that is generally perpendicular to the crankcase axis;
a crankshaft extending along the crankcase axis from a first end to a second end; a plurality of piston arms spaced apart from one another along the crankshaft;

and a corresponding plurality of crossheads; wherein each piston arm is pivotally coupled to the crankshaft at a first end of a corresponding piston arm, and each piston arm is pivotally coupled to a crosshead at a second end of the piston arm, each crosshead moving reciprocal along a crosshead axis;

a crankshaft gear mounted on each end of the crankshaft;

a pinion assembly extending along a pinion axis extending between the first end and second end of the crankcase housing, the pinion axis parallel with, but spaced apart from the crankcase axis, the pinion assembly having a first pinion shaft extending along the pinion axis between a first end and a second end of the first pinion shaft, a second pinion shaft extending along the pinion axis between a first end and a second end of the second pinion shaft, an input pinion gear disposed along each pinion shaft adjacent the first end of each pinion shaft, each input pinion gear having a diameter D1;

a keyless coupler interconnecting the second ends of the first and second pinion shafts;

first and second intermediate gear assemblies, each intermediate gear assembly extending along an intermediate axis and within the crankcase housing between the pinion gears and the crankshaft gears, the intermediate axis extending parallel with, but spaced apart from the crankcase axis and the pinion axis, each intermediate gear assembly having an intermediate shaft extending along the intermediate axis between a first end and a second end of the intermediate shaft, each intermediate gear assembly further having a first intermediate gear having a diameter D2 and mounted adjacent the first end of the intermediate shaft and a second intermediate gear having a diameter D3 and mounted adjacent the second end of the intermediate shaft, the first intermediate gear meshed with an input pinion gear and the second intermediate gear meshed with a crankshaft gear, wherein the diameter D3 is less than the diameter D2.

15. The hydraulic fracturing pump of claim 14, wherein each input pinion gear is integrally formed on its respective pinion shaft.

16. The hydraulic fracturing pump of claim 14, wherein the diameter D3 is equal to or larger than the diameter D1.

17. The hydraulic fracturing pump of claim 14, wherein each crankshaft gear comprises a ring gear with teeth disposed about the inner periphery of the ring gear.

18. The hydraulic fracturing pump of claim 14, further comprising a first index on the first end of each pinion shaft and a second index on the second end of each pinion shaft.

19. The hydraulic fracturing pump of claim 14, wherein the diameter of the intermediate gear engaging the pinion gear is larger than the diameter of the intermediate gear engaging the crankshaft gear.

20. The hydraulic fracturing pump of claim 14, further comprising a movable coupler access panel disposed in the crankcase housing adjacent the keyless coupler.

21. The hydraulic fracturing pump of claim 14, further comprising a power source coupled to a single input shaft connected to one of the first and second pinion shafts and used to drive both of the first and second pinion shafts.

* * * * *